United States Patent [19]

Dreier, Jr. et al.

[11] 3,769,034

[45] Oct. 30, 1973

[54] SHELF STABLE, INTERMEDIATE MOISTURE, FLAKE TEXTURED DOUGHS AND METHOD FOR MAKING SAME

[75] Inventors: William M. Dreier, Jr., Minneapolis; Donald C. Jacobson, St. Paul, both of Minn.

[73] Assignee: General Mills, Inc., Minneapolis, Minn.

[22] Filed: Jan. 19, 1971

[21] Appl. No.: 107,834

[52] U.S. Cl. .................. 426/151, 99/92, 99/150 R
[51] Int. Cl. ............................................ A21d 15/00
[58] Field of Search .................. 99/86, 90 R, 92, 99/150 R

[56] References Cited
UNITED STATES PATENTS

| | | | |
|---|---|---|---|
| 2,549,595 | 4/1951 | Gregor | 99/90 R |
| 2,919,986 | 1/1960 | Johnson | 99/92 X |
| 3,294,547 | 12/1966 | Koolstra | 99/92 |

*Primary Examiner*—Raymond N. Jones
*Assistant Examiner*—James Robert Hoffman
*Attorney*—Anthony A. Juettner, Gene O. Enockson and Elizabeth Tweedy

[57] ABSTRACT

A dough composition having a moisture level of about 18 to 26 percent by weight of the dough composition and which is shelf stable for prolonged periods of time. The dough composition contains an amylaceous component, a portion of which is gelatinized and a portion ungelatinized, shortening, a mold and yeast inhibitor and water.

8 Claims, No Drawings

SHELF STABLE, INTERMEDIATE MOISTURE, FLAKE TEXTURED DOUGHS AND METHOD FOR MAKING SAME

This invention relates to shelf stable, intermediate moisture dough compositions. More particularly, this invention relates to shelf stable dough compositions for flaky textured products which contain amylaceous material, part of which is gelatinized and part of which is ungelatinized, and which have a moisture content of from about 18 to 26 percent by weight of the dough composition.

By dough compositions for flaky textured products is meant dough compositions suitable for producing products such as pie crust, tarts, puff paste, cream puffs and strudel. These dough compositions have a flaky, lamellae structure. This structure is traditionally developed by incorporating air and flakes or lamellae of shortening within the dough so that upon baking the crust consists of more or less loosely bound together flakes or lamellae of baked dough.

Heretofore, shelf stable, intermediate moisture dough compositions useful for making flaky textured products have been stabilized by incorporating corn sugars or glycerine into the formulation or by using a very low pH formulation. While a degree of stability may be achieved by these methods, there are attendant problems. In general, flavors alien to dough products are encountered; sourness in acid stabilized dough products, sweetness in sugar stabilized dough products and sweetness, bitterness and sometimes a peppery note in glycerine stabilized dough products. In addition, excessively rapid browning may occur where larger than normal amounts of reducing sugars are added or develop during preparation. Some components added to promote stability, for example glycerine, can give rise to handling problems and to excessive bleeding of the shortening.

In the following detailed description of the invention "by weight on a moisture free basis" means that the moisture normally associated with the various ingredients has been included in the overall moisture calculation and the percentages of ingredients refer to the non-moisture portion of each ingredient. "On an 'as is' basis" means that moisture normally associated with the various ingredients is included in the reacted percentage by weight.

The dough compositions of the present invention are pliable, bland, intermediate moisture level doughs of the flaky texture type which are shelf stable for months under non-refrigerated storage conditions. The compositions include about 18 to 26 percent, preferably about 22 to 24 percent, water by weight of the dough composition, about 20 to 35 percent, preferably about 25 to 30 percent, shortening by weight, on a moisture free basis, of the dough composition and an amylaceous component selected from starch, cereal flour and mixtures thereof, a portion of the starch in the amylaceous component being gelatinized and a portion being ungelatinized. A dough plasticizer is included to promote workability of the dough. Also included is a mold and yeast inhibitor.

Normally the amylaceous component comprises from about 40 to 60 percent by weight on a moisture free basis of the dough composition. From about 20 to 80 percent by weight, on a moisture free basis, of the amylaceous component is in the form of gelatinized starch, the remainder of the amylaceous fraction being in an ungelatinized form. Preferably, the amylaceous component contains from about 40 to 60 percent by weight, on a moisture free basis, of gelatinized starch or flour. The amylaceous component can be made by mixing raw cereal flour with gelatinized starch, mixing raw starch with gelatinized starch, or gelatinizing the starch in the cereal flour so that part of the cereal flour starch is in a gelatinized form and part is not or by mixing gelatinized and raw flours. This type of partial gelatinization can be attained through controlled cooking of the cereal flour in a moist atmosphere. The degree of gelatinization in partially cooked flours can be determined by measuring the amount of cell rupture caused by the cooking process.

Shortening is included in the dough compositions in amounts of from about 20 to 35 percent by weight, on a moisture free basis, of the composition. Fat levels of this magnitude are normally necessary in any dough composition to produce the flaky texture to which this invention is directed. The shortening can be either of animal or vegetable origin and solid or plastic. Commonly used fats are: animal fats such as lard, rearranged lard, tallow, hydrogenated animal oils and solid vegetable oils such as hydrogenated vegetable shortening.

A plasticizer is incorporated into the dough in amounts of from about 0.0 to 3.0 percent by weight, on a moisture free basis, of the dough composition. Some suitable plasticizers are propylene glycol, glycerine, sorbitol, dextrose, levulose, maltose and corn syrup solids. Propylene glycol is preferred when potassium sorbate is used as the mold and yeast inhibitor as the mold and yeast inhibiting effect of potassium sorbate appears to be enhanced.

A mold and yeast inhibitor is incorporated into the dough composition of this invention. Typical mold and yeast inhibitors which can be used include sodium benzoate, benzoic acid, calcium propionate, sodium propionate, sorbic acid, potassium sorbate, calcium sorbate, diethyl pyrocarbonate, and salts and esters of monohydroxybenzoic acid. Each inhibitor is incorporated in the particular amount at which it prevents yeast and mold growth. Good results were obtained using potassium sorbate in amounts of from about 0.15 to 0.30 percent by weight, on a moisture free basis, of the dough composition.

The use of chelating agents such as ethylene diaminetetraacetic acid have been used to advantage in the formulations. Normally, chelating agents are used in amounts of about 0.001 to 0.010 percent by weight, on a moisture free basis, of the dough composition. Such ingredients inhibit browning at high temperature storage conditions.

The dough compositions of this invention are made by mixing the dry constituents of the dough composition with the shortening in such a manner that the moisture absorbing capacity of the gelatinized starch is maintained and either simultaneously or subsequently adding water and working the mixture into a dough. Excessive coating of the gelatinized starch with the shortening acts as a barrier and reduces or destroys the moisture absorbing capacity of the gelatinized starch. When this occurs, the microbiological stability of the dough composition is lost. A number of specific sequences of mixing can be used. One method includes gently mixing the amylaceous ingredients and the other dry, insoluble, free flowing ingredients; gently admixing the shortening and the resulting mixture of dry ingredients; dissolving the soluble ingredients in water; and gently mixing the resulting solution into the dry ingredients and shortening mixture to form a dough. One alternate method of making the dough compositions is: intensely mixing about half of the shortening with the raw flour, admixing the pregelatinized starch and water insoluble ingredients into the mixture, followed by gently mixing or cutting the remaining shortening into the mixture until the remaining shortening has formed pea size pieces. The water soluble ingredients are then added in water solution and the mixture formed into a dough. Still another alternate method of making the dough composition where gluten development is desired involves mixing a portion of the raw flour with the water and beating it intensely and then adding the water soluble ingredients to the mixture. Separately, the remaining water insoluble ingredients are gently mixed with the shortening. The mixture of raw starch, water and water soluble ingredients are then mixed into the mixture of water insoluble ingredients and shortening and the resulting mixture formed into a dough.

Once the dough compositions are made they are pliable and shelf stable for months under non-refrigerated conditions. They may be in the shape of rolled out pieces which the consumer merely bakes. Alternatively, they may be in the shape of balls or squares which the consumer rolls out before using and then bakes. Baking is usually done at temperatures of about 325° to 450° F.

The following examples illustrate the general procedures for making the dough compositions of this invention.

EXAMPLE I

This example shows one procedure for making dough compositions of this invention.

A pie or tart dough composition was made having the following dough formulation:

| | Percent By Weight |
|---|---|
| Raw soft wheat four (9% protein content) | 30.0000 |
| Gelatinized wheat flour (100% gelatinized starch by weight) | 20.0000 |
| Shortening** | 27.0000 |
| Salt | 0.0084 |
| Propylene glycol | 2.0000 |
| Potassium sorbate | 0.2000 |
| Color | 0.0006 |
| Ethylenediaminetetracetic acid | 0.0050 |
| Water | 19.8000* |
| Total | 100.0000 |

*Quantity of water used to bring moisture level of mixture to about 24% by weight of the mixture
**A plastic tallow base shortening containing tallow flakes and rearranged lard in amounts up to about 10% by weight, stabilized with butylhydroxy toluene and butylhydroxy anisol origin having a solid fat index of:

| Temperature | S. F. I. |
|---|---|
| 50°F. | 29–33% |
| 70°F. | 21–25% |
| 80°F. | 29–22% |
| 92°F. | 14–17% |
| 104°F. | 8–10% |

The raw wheat flour and the pregelatinized flour were thoroughly blended. The resulting mixture was then blended with the plastic shortening using moderately extensive mixing. The salt, ethylenediaminetetraacetic acid, propylene glycol and potassium sorbate were dissolved in the water. The resulting solution was then mixed into the raw flour-pregelatinized flour-shortening mixture. As a control, samples of the resulting dough pieces were baked at a temperature of about 350° F. for a period of about 10 minutes to produce flaky, golden brown pie crusts. Other dough pieces were stored under both ambient room temperature conditions and at a relative humidity of 65 percent with temperatures cycled from 70° to 90° F. At the end of a 12 week period, the dough composition shows no significant bacteria, mold or yeast growth. After baking, the pie crust had good flavor, color, flaky texture and eating quality.

EXAMPLE II

This example shows another procedure for making the dough compositions of this invention.

Plain lard was used in the formulation in place of the shortening shown in Example I. Otherwise the formulation used was the same as that described in Example I.

The raw wheat flour was mixed with one half the lard. The pregelatinized flour was then mixed into the raw wheat flour-shortening mixture. The remainder of the shortening was cut into the resulting mixture until it was subdivided into pieces about the size of peas. The salt, propylene glycol, potassium sorbate, color and ethylenediaminetetraacetic acid were dissolved in the water and the solution gently mixed into the mixture of raw wheat flour, pregelatinized wheat flour and shortening. The resulting dough was rolled out into flat pieces for crusts. As a control, samples of the dough pieces were baked at a temperature of about 350° F. for a period of about 10 minutes to produce flaky, golden brown pie crusts. The remainder of the dough pieces were stored under ambient room temperature conditions. At the end of a 22 week period the dough composition showed no significant bacteria, mold or yeast growth. After baking the pie crust had good flavor, color, flaky texture and eating quality.

EXAMPLE III

This example shows still another procedure for making the dough compositions of this invention.

The formulation of the dough composition was the same as shown in Example I.

The salt, propylene glycol, potassium sorbate, color and ethylenediaminetetraacetic acid were dissolved in the water. About 20 percent of the raw wheat flour was added to the solution and the mixture was beaten intensely for a period of ten minutes. The remainder of the raw wheat flour was mixed with the pregelatinized wheat flour. The shortening was added to and mixed with the resulting raw wheat flour-pregelatinized wheat flour mixture. The mixture containing the water, propylene glycol, potassium sorbate, color, ethylenediaminetatraacetic acid and a portion of the raw wheat flour was added to the mixture containing raw wheat flour, pregelatinized wheat flour and shortening. The resulting dough was rolled out and produced flaky, golden brown pie crusts of good quality upon baking at a temperature of about 350° F. for a period of 10 minutes.

The embodiments of the invention in which an exclusive property or privilege is claimed are defined as follows:

1. A shelf stable dough composition comprising: about 40 to 60 percent amylaceous component by weight, on a moisture free basis, of the dough composition, said amylaceous component being selected from starch, cereal flour and mixtures thereof wherein about 20 to 80 percent of said amylaceous component by weight on a moisture free basis is gelatinized starch,
about 20 to 35 percent shortening by weight, on a moisture free basis, of the dough composition,
a mold and yeast inhibitor in an amount at which it prevents yeast and mold growth, and
about 18 to 26 percent overall moisture content by weight of the dough composition.

2. The dough composition of claim 1 wherein the overall moisture content is about 22 to 24 percent by weight of the dough composition.

3. The dough composition of claim 1 wherein about 40 to 60 percent of said amylaceous component by weight on a moisture free basis is gelatinized starch.

4. The dough composition of claim 1 wherein the amount of shortening in said composition is about 25 to 30 percent by weight on a moisture free basis.

5. The dough composition of claim 1 wherein said composition also contains about 0.001 to 0.010 percent chelating agent by weight on a moisture free basis of the dough composition.

6. The dough composition of claim 5 wherein the chelating agent is ethylenediaminetetraacetic acid.

7. The dough composition of claim 1 wherein said composition also contains a dough plasticizer in an amount up to about 3 percent by weight on a moisture free basis of the dough composition.

8. A process for making a dough composition comprising:
mixing about 40 to 60 percent amylaceous component by weight on a moisture free basis of the dough composition, said amylaceous component being selected from starch, cereal flour and mixtures thereof, wherein about 20 to 80 percent of said amylaceous component by weight on a moisture free basis is gelatinized starch,
a mold and yeast inhibitor in amounts at which it prevents yeast and mold growth, and
about 20 to 35 percent shortening by weight of the dough composition in order to maintain the moisture absorbing capacity of the gelatinized starch,
adding water simultaneously with or subsequently to the mixing step in an amount to bring the moisture content of the dough composition to about 18 to 26 percent by weight of the dough composition, and working the resulting mixture into a dough.

* * * * *